(12) United States Patent
Jang et al.

(10) Patent No.: US 8,865,086 B2
(45) Date of Patent: Oct. 21, 2014

(54) QUENCHING APPARATUS FOR A REACTOR

(75) Inventors: Tae Young Jang, Seoul (KR); Min Ki Ahn, Changwon-si (KR); Sun Hyuk Bae, Daejeon (KR); Gyung Rok Kim, Daejeon (KR); Yoon Mang Hwang, Daejeon (KR); Kyoo Sung Park, Daejeon (KR); Sun Choi, Daejeon (KR); Myung Jun Kim, Seoul (KR)

(73) Assignee: SK Innovation Co., Ltd., Seoul (KR)

( * ) Notice: Subject to any disclaimer, the term of this patent is extended or adjusted under 35 U.S.C. 154(b) by 386 days.

(21) Appl. No.: 13/512,933

(22) PCT Filed: Dec. 29, 2009

(86) PCT No.: PCT/KR2009/007895
§ 371 (c)(1),
(2), (4) Date: May 31, 2012

(87) PCT Pub. No.: WO2011/068279
PCT Pub. Date: Jun. 9, 2011

(65) Prior Publication Data
US 2012/0230883 A1    Sep. 13, 2012

(30) Foreign Application Priority Data
Dec. 1, 2009  (KR) ........................ 10-2009-0117940

(51) Int. Cl.
*B01J 19/00*    (2006.01)
*B01J 19/24*    (2006.01)
(Continued)

(52) U.S. Cl.
CPC .... *B01J 19/0013* (2013.01); *B01J 2208/00371* (2013.01); *B01F 5/0456* (2013.01); *B01J*
(Continued)

(58) Field of Classification Search
CPC ............................................. B01J 2208/00371
USPC .......................... 422/606, 645, 647, 648, 207
See application file for complete search history.

(56) References Cited

U.S. PATENT DOCUMENTS 3,353,924 A   1/1965  Riopelle
3,541,000 A   8/1968  Hanson
(Continued)

FOREIGN PATENT DOCUMENTS

JP    03-175290 A    7/1991
JP    2007-277033 A  10/2007
(Continued)

OTHER PUBLICATIONS

International Search Report for priority application PCT/KR2009/007895, mailed Dec. 17, 2010 (English translation, 2 pages).

*Primary Examiner* — Lessanework Seifu
(74) *Attorney, Agent, or Firm* — Abelman, Frayne & Schwab

(57) ABSTRACT

A quenching apparatus for a reactor is disclosed. The quenching apparatus includes a quenching unit (31) and a mixing unit (41). The quenching unit includes fluid distribution pipes (33) which branch off from a central portion of the quenching unit in radial directions and eject quenching fluid, and one or more first fluid outlets (35) which are formed through the bottom of the quenching unit. The mixing unit includes inclined baffles (43), one or more partitions (42) and a second fluid outlet (45). The inclined baffles are respectively disposed under the first fluid outlets. The partitions partition a space between inner and outer sidewalls of the mixing unit into a plurality of separated spaces in which the inclined baffles are respectively disposed. Fluid guided by the inclined baffles and the partitions is discharged out of the mixing unit through the second fluid outlet.

12 Claims, 4 Drawing Sheets

(51) Int. Cl.
  *B01F 5/04* (2006.01)
  *B01J 8/04* (2006.01)
  *B01F 5/06* (2006.01)

(52) U.S. Cl.
  CPC .... 8/0496 (2013.01); *B01F 5/0451* (2013.01); *B01F 5/0688* (2013.01); *B01J 19/006* (2013.01); *B01J 8/0492* (2013.01); *B01F 5/0618* (2013.01); *B01J 2219/00123* (2013.01); *B01F 5/0682* (2013.01)
  USPC ........... 422/207; 422/606; 422/645; 422/647; 422/648; 422/310; 422/220; 422/224

(56) References Cited

U.S. PATENT DOCUMENTS

| | | |
|---|---|---|
| 4,669,890 A | 6/1987 | Peyrot |
| 5,152,967 A | 10/1992 | Rossetti et al. |
| 5,989,502 A | 11/1999 | Nelson et al. |
| 7,045,103 B2 * | 5/2006 | McDougald et al. ......... 422/605 |

FOREIGN PATENT DOCUMENTS

| | | |
|---|---|---|
| KR | 10-1999-0080521 A | 11/1999 |
| KR | 10-2000-0016285 A | 3/2000 |

* cited by examiner

QUENCHING APPARATUS FOR A REACTOR

CLAIM FOR PRIORITY

This application claims priority to PCT/KR2009/007895, filed on 29 Dec. 2009, which claims benefit to Korean Application No. 10-2009-0117940, filed on 1 Dec. 2009.

TECHNICAL FIELD

The present invention relates to a quenching apparatus for removing heat of reaction from a reactor.

BACKGROUND ART

As is well known in the art, most reactions generated in an oil refining process are exothermic reactions. Generally, a quenching zone is formed between catalytic layers to remove heat generated by the exothermic reactions. In the quenching zone, high-pressure gas or liquid descending from the upper catalytic layer is mixed with quenching fluid which is injected into the quenching zone, thus cooling beneath a predetermined temperature.

Typically, the quenching zone includes a quenching box and a mixing box. In the quenching box, a quenching ring or a quenching pipe ejects quenching fluid to gas or liquid descending from the upper catalytic layer, thus primarily mixing the quenching fluid with the gas or liquid, thereby cooling the gas or liquid.

To further enhance the quenching efficiency, the quenching fluid and the gas or liquid flow into the mixing box and then are secondarily mixed with each other in the mixing box. The recent trend of the structure of the quenching zone is to keep the quenching fluid in the quenching zone for a longer residence time so as to increase the duration that the quenching fluid makes contact with the gas or liquid. To realize this, a mechanical mechanism for creating swirls has been used.

Representative examples of conventional mixing apparatuses used in quenching zones were proposed in U.S. Pat. No. 3,353,924, No. 3,541,000, No. 4,669,890 and No. 5,152,967. However, some of these apparatuses are complicated and are thus prone to plugging. In addition, some need a relatively large space to provide a satisfactory degree of mixing. Furthermore, some induce a large drop in pressure and thus cannot be used.

SUMMARY OF THE INVENTION

The present invention has been made in an effort to provide a quenching apparatus which has improved quenching performance.

Accordingly, the present invention has been made keeping in mind the above problems occurring in the prior art, and the present invention provides a quenching apparatus for a reactor including a quenching unit and a mixing unit. The quenching unit includes fluid distribution pipes branching radially off from a central portion of the quenching unit and ejecting quenching fluid, and one or more first fluid outlets formed through a bottom of the quenching unit. The mixing unit includes inclined baffles respectively disposed under the first fluid outlets, one or more partitions partitioning a space between inner and outer sidewalls of the mixing unit into a plurality of separated spaces in which the inclined baffles are respectively disposed, and a second fluid outlet through which fluid agitated by the inclined baffles and the partitions is discharged out of the mixing unit.

The fluid distribution pipes may be connected to a fluid supply pipe. The fluid supply pipe may supply the quenching fluid from an outside of the reactor into the quenching unit.

The fluid distribution pipes may extend radially from the central portion of the quenching unit are configured such that first ends of the fluid distribution pipes are disposed at a radial center of the quenching unit and second ends thereof are disposed higher than the first ends thereof.

Furthermore, each of the inclined baffles may be inclined downwards by a predetermined angle, so that fluid that has dropped vertically from the corresponding first fluid outlet comes into contact with the inclined baffle and flows downwards therealong.

In addition, a plurality of baffles may be provided on the bottom of the quenching unit.

The quenching unit may be reduced in cross-sectional area from the top to the bottom, so that the level of fluid can be easily raised to a desired degree As well, a plurality of baffles may be provided on a bottom of the mixing unit.

The one or more first fluid outlets may be disposed at positions corresponding to the space between the inner and outer sidewalls of the mixing unit.

The one or more first fluid outlets may be arranged concentrically with the outer sidewall of the quenching unit.

Furthermore, fluid discharge holes may be formed in each of the fluid distribution pipes and arranged along a longitudinal direction of the fluid distribution pipe.

The second fluid outlet may be formed through the inner sidewall of the mixing unit. A guide may be provided around the second fluid outlet to swirl the fluid.

In a quenching apparatus according to the present invention, swirls of fluid can be created in the entirety of three-dimensional space in a quenching unit rather than only in a two-dimensional plane. Furthermore, the creation of fluid turbulence is maximized in the mixing unit. Therefore, the fluid mixing efficiency of the apparatus can be markedly enhanced.

Moreover, outlets are formed in the inner sidewall of the mixing unit, so that when the fluid passes through the outlets, it can be further agitated. In addition, guides are provided in a circular hole which communicates with the outlets. Thus, the fluid swirls when it is dropped downwards through the circular hole, thus maximizing contact between gas and liquid.

DETAILED DESCRIPTION

Figure 1:
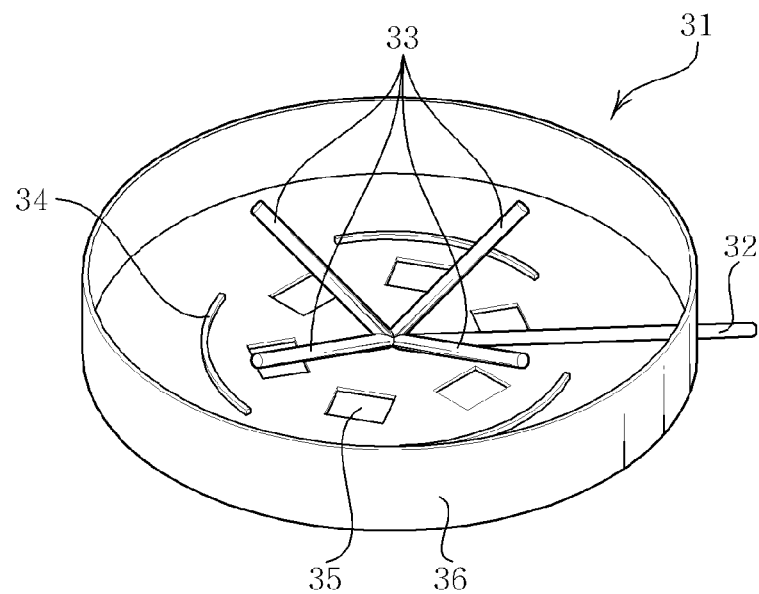
FIG. 1 is a perspective view illustrating a quenching unit of a quenching apparatus, according to an embodiment of the present invention.

The above and other objects, features and advantages of the present invention will be more clearly understood from the following detailed description taken in conjunction with the accompanying drawings. Reference now should be made to the drawings, in which the same reference numerals are used throughout the different drawings to designate the same or similar components.

In the following description, when it is determined that the detailed description of the conventional function and conventional structure would confuse the gist of the present invention, such a description may be omitted.

Hereinafter, embodiments of the present invention will be described in detail with reference to the attached drawings.

Unlike the conventional technique which uses a basic annular or single pipe-shaped quenching fluid injector, a quenching apparatus according to the present invention uses a quenching pipe which is configured such that a swirling effect is realized to increase the duration that the gas makes contact with fluid.

FIG. 1 is a perspective view illustrating a quenching unit 31 of the quenching apparatus according to the present invention.

The quenching apparatus includes the quenching unit 31, and a mixing unit 41. Quenching fluid is supplied into the quenching unit 31. The quenching unit 31 brings the quenching fluid into contact with a reactant that has passed through a catalytic layer disposed thereabove. The mixing unit 41 functions to more reliably mix the quenching fluid with the reactant that has passed through the catalytic layer.

The quenching unit 31 includes a fluid supply pipe 32 which extends to the central portion of the quenching unit 31 to supply quenching fluid from the outside into the quenching unit 31, and fluid distribution pipes 33 which branch off from the inner end of the fluid supply pipe 32 in radial directions to eject the quenching fluid in the quenching unit 31. Furthermore, one or more first fluid outlets 35 are formed through the bottom of the quenching unit 31.

The fluid distribution pipes 33 form a shape such that two or more pipes branch from the central portion of the quenching unit 31. In other words, the fluid distribution pipes 33 are configured such that two or more pipes branch form the inner end of the fluid supply pipe 32 and extend predetermined lengths.

Furthermore, the fluid distribution pipes 33 which extend radially from the center of the quenching unit 31 are configured such that the inner ends thereof are disposed at the radial center of the quenching unit 31 and the outer ends thereof are disposed higher than the inner ends thereof.

As such, the fluid distribution pipes 33 are configured such that they extend upwards at predetermined angles with respect to a horizontal plane of the quenching unit 31. In the present invention, the fluid distribution pipes 33 are configured such that they extend predetermined lengths throughout the entire three-dimensional space of the quenching unit 31 rather than extending on a plane, thus making it possible to generate swirling throughout the entire space inside the quenching unit 31. Thereby, quenching fluid can come into contact with the reactant for a longer time.

Furthermore, fluid discharge holes are formed in each fluid distribution pipe 33 at positions spaced apart from each other in the longitudinal direction. If quenching fluid is discharged only through the end of the fluid distribution pipe 33, as in the conventional technique, the duration for which the quenching fluid makes contact with the reactant is reduced. This reduction in duration deteriorates the efficiency with which the quenching fluid is mixed with the reactant, thus decreasing the quenching effect. To avoid this disadvantage, in the present invention, fluid discharge holes are formed in the fluid distribution pipe 33 at positions spaced apart from each other in the longitudinal direction, such that quenching fluid can be distributed into the quenching unit over as wide an area as possible, thus increasing not only the contact area between the quenching fluid and the reactant but also the duration that the quenching fluid makes contact with the reactant. Therefore, the present invention can markedly enhance the quenching efficiency, compared to that of the conventional technique.

In particular, as a difference in design between the conventional quenching unit and the quenching unit 31 of the quenching apparatus of the present invention, the conventional quenching unit is configured such that swirls are created on a plane so that a zone in which quenching fluid comes into contact with a reactant is restricted, but the present invention is configured such that the fluid distribution pipes 33 branch off from the fluid supply pipe 32 at predetermined angles and extend predetermined lengths upwards. Therefore, quenching fluid can be discharged from the fluid distribution pipes 33 over the entirety of the three-dimensional space of the quenching unit 31. Thus, swirls can be created throughout the entire space of the quenching unit 31.

Furthermore, a plurality of baffles 34 is provided on the bottom of the quenching unit 31. The baffles 34 may have various shapes, for example, a circular shape, a linear shape which bends several times, etc.

In addition, in consideration of the case where an increase in the level of fluid is required, the quenching unit may have a frusto-conical shape to control the level of fluid. In other words, in the cylindrical quenching unit, if the amount of fluid in the quenching unit 31 is relatively small, it is difficult to control, that is, raise, the level of fluid. However, in the frusto-conical quenching unit the cross-sectional area of which is reduced from the top to the bottom, even if the amount of fluid in the quenching unit 31 is not enough, the level of fluid can be easily raised to a desired degree. In the above description, the term 'frusto-conical' is used, but the shape of the quenching unit 31 is not limited to this. In other words, the quenching unit 31 can be of any shape, as long as the cross-sectional area thereof is reduced from the top to the bottom.

In the embodiment of the present invention, the baffles 34 are disposed on the bottom of the quenching unit 31 between the first fluid outlets 35 and the sidewall 36 of the quenching unit. The baffles 34 comprise two or more baffles 34 which are spaced apart from each other at regular angular intervals and encompass the first fluid outlets 35.

In addition, the baffles 34 are oriented in the direction in which they disturb the flow of quenching fluid and reactant in the quenching unit 31. Thanks to this orientation of the baffles 34, the quenching fluid can be better mixed with the reactant.

Figure 2:
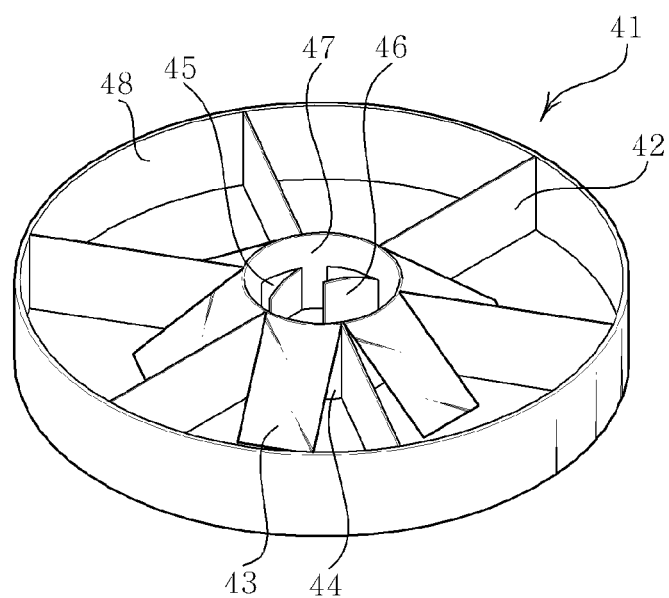
FIG. 2 is a perspective view illustrating a mixing unit of the quenching apparatus according to the present invention.

FIG. 2 is a view illustrating the mixing unit 41 according to the present invention. Referring to FIG. 2, the mixing unit 41 of the quenching apparatus according to the present invention includes inclined baffles 43, one or more partitions 42, and second fluid outlets 45. The inclined baffles 43 are respectively disposed under the first fluid outlets 35. The partitions 42 compart the space between inner and outer sidewalls 44 and 48 of the mixing unit into several spaces in which the inclined baffles 43 are respectively disposed. Mixed fluid which is agitated by the inclined baffles 43 and the partitions 42 is discharged out of the mixing unit 41 through the second fluid outlets 45.

Typically, the mixing unit 41 has a cylindrical box shape. In the embodiment, although the mixing unit has been illustrated as having a cylindrical box shape, it is not restricted.

The mixing unit of the conventional technique has a box structure which includes a fluid inlet through which fluid is supplied from the quenching unit 31 into the mixing unit 41, and a fluid outlet which is disposed at a position facing the fluid inlet such that the quenching fluid charged into the box is mixed. The conventional mixing unit has the advantage of a simple structure but the disadvantage of low mixing efficiency.

Therefore, to enhance the mixing efficiency, in the mixing unit of the present invention, the space (mixing zone) in the mixing unit is partitioned into several sections, preferably, two or more sections, more preferably, six sections. As such, to partition the space in the mixing unit 41, the partitions 42 are provided in the mixing unit 41.

Furthermore, a baffle (not shown) may be provided on the bottom of each section of the mixing unit 41 to create turbulence in the fluid drawn thereinto. The baffle which is provided on the bottom of the mixing zone comprises a thin plate which has a predetermined height and is placed upright. As well, the baffle may be bent a predetermined angle or be round.

The inclined baffles 43 of the mixing unit 41 are designed such that fluid that falls vertically from the first fluid outlets 35 comes into contact with the upper surfaces of the inclined baffles 43 and flows downwards in inclined directions.

In other words, the mixing zone may have the inclined baffles 43 along with the baffles which are vertically placed on the bottom of the mixing zone or, alternatively, have only the inclined baffles 43. Each inclined baffle 43 is inclined with respect to the bottom of the mixing unit 41 at a predetermined angle under the corresponding first fluid outlet 35 of the quenching unit 31.

That is, to effectively create turbulence in the flow of the fluid drawn into the mixing zone, the mixing unit 41 is designed such that fluid drawn from the quenching unit 31 into the mixing unit 41 flows downwards along the inclined baffles 43 as if on a slide and strikes the sidewall of the mixing unit 41, thus increasing the mixing efficiency.

As such, the function of the inclined baffles 43 which are respectively disposed under the first fluid outlets 35 of the quenching unit 31 is to allow fluid drawn into the mixing unit 41 to slide thereon.

Furthermore, in the mixing unit 41, the sections which are separated from each other are respectively formed under the first fluid outlets 35 of the quenching unit 31. Each section in the mixing unit 41 has one inclined baffle 43. Fluid which is discharged through each first fluid outlet 35 of the quenching unit 31 is dropped onto the upper surface of the corresponding inclined baffle 43 of the mixing unit 41.

Fluid which has been drawn into the mixing unit 41 and dropped onto the inclined baffles 43 disposed under the first fluid outlets 35 slides along the upper surfaces of the inclined baffles 43 and creates turbulent flow. Thereafter, the fluid strikes the partitions 42, the outer sidewall 48 or the baffles in the partitioned sections of the mixing zone and is thus further agitated. Thereby, the mixing performance of the mixing unit 41 can be further enhanced.

The second fluid outlets 45 are formed in the inner sidewall 44 of the mixing unit 41, so that mixed fluid is discharged out of the mixing unit 41 downwards through the second fluid outlets 45 to pass through an additional reaction process of the reactor or discharge reactant. Furthermore, when the mixed fluid is discharged downwards through the second fluid outlets 45 formed in the inner sidewall 44, the fluid can be further agitated while flowing through a concentric circular hole 47 which is defined by the inner sidewall 44.

In other words, the second fluid outlets 45 are formed by making holes in the inner sidewalls 44, such that fluid is agitated after passing through the holes.

Furthermore, guides 46 are provided in the circular hole 47 which is defined by the inner sidewall 44. Thus, when fluid drops downwards through the circular hole 47, the fluid swirls due to the guides 46, thus maximizing contact between gas and liquid. Therefore, the mixing performance of the mixing unit 41 can be further enhanced by the guides 46.

Figure 3:
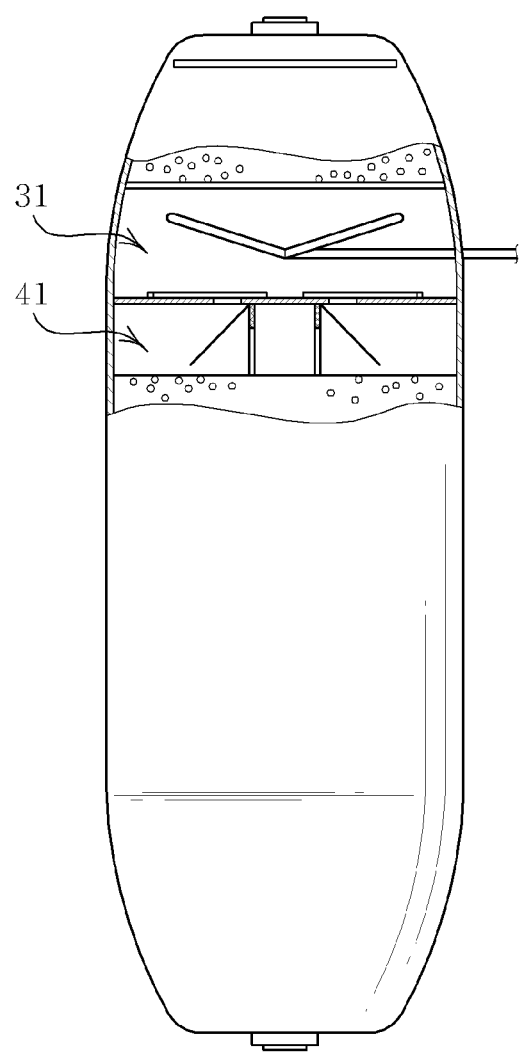
FIG. 3 is a partially broken view showing a reactor having the quenching apparatus according to the present invention.
Figure 4:
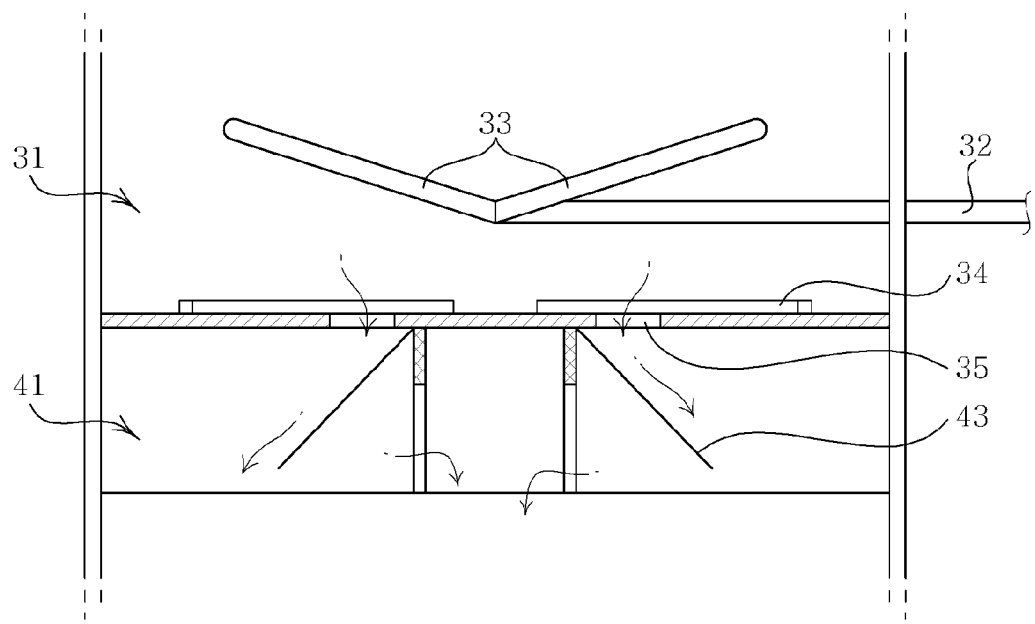
FIG. 4 is a partial sectional view of the reactor having the quenching apparatus according to the present invention.

FIGS. 3 and 4 respectively are a partially broken view and a partial sectional view illustrating a reactor having the quenching apparatus according to the present invention.

As shown in FIGS. 3 and 4, reactant is supplied from the upper portion in the reactor into the quenching unit 31 of the quenching apparatus of the present invention. The reactant drawn into the quenching unit 31 can come into contact with quenching fluid discharged from the fluid distribution pipes 33 in the entirety of the space of the quenching unit 31.

Furthermore, when the quenching fluid and the reactant are drawn into the mixing unit 41 through the first fluid outlets 35, they slide along the surfaces of the inclined baffles 43 and swirl, thus being further effectively mixed with each other.

Figure 5:
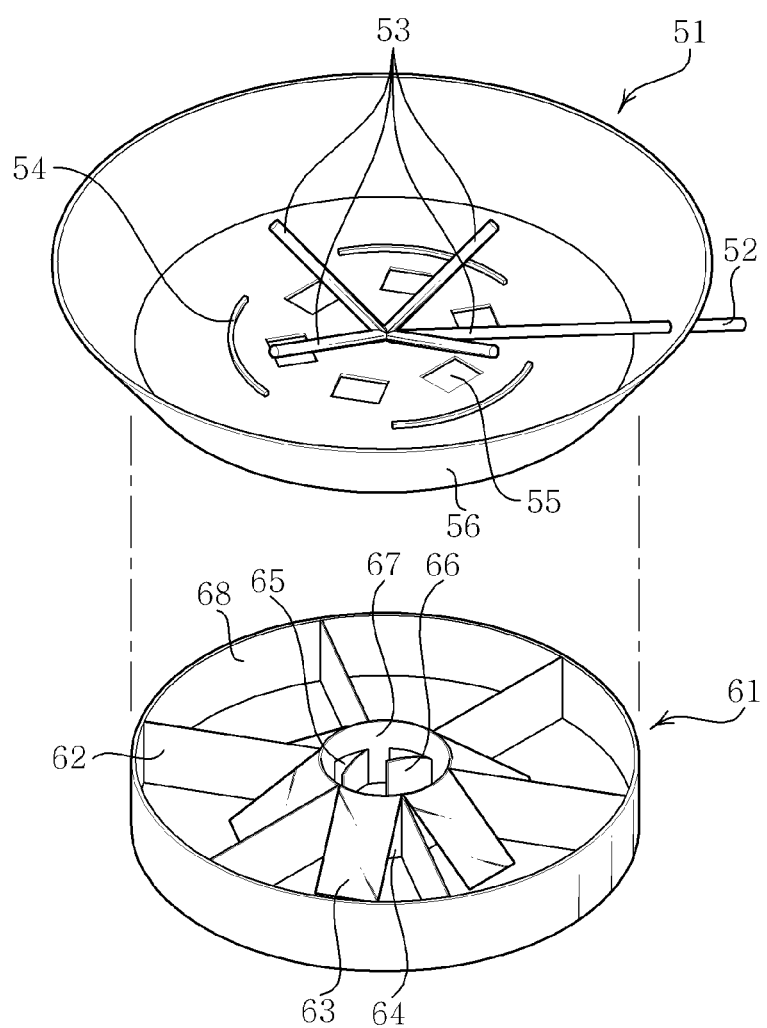
FIG. 5 illustrates a quenching apparatus having a frusto-conical quenching unit, according to another embodiment of the present invention.

FIG. 5 illustrates a quenching unit 51 having the frusto-conical shape described above.

As shown in FIG. 5, the quenching unit 51 includes two or more fluid distribution pipes 53, a fluid supply pipe 52, two or more baffles 54 and one or more first fluid outlets 55, in the same manner as that of the quenching unit 31 which has been described above. However, unlike the quenching unit 31, the sidewall 56 of the quenching unit 51 is configured such that the cross-sectional area thereof is reduced from the top to the bottom.

In the case of the frusto-conical quenching unit 51, when an increase in the level of fluid is required, even if the amount of fluid in the quenching unit 51 is relatively small, the level of fluid can be easily increased, in other words, easily controlled.

In the above description of FIG. 5, although the term 'frusto-conical' has been used, the shape of the quenching unit 51 is not limited to this, in other words, it can be of any shape, as long as the cross-sectional area thereof is reduced from the top to the bottom.

Furthermore, a mixing unit 61 is provided under the quenching unit 51. The mixing unit 61 has the same shape as that of the mixing unit 31 which has been described above. In other words, the quenching fluid and reactant which have been primarily mixed with each other in the quenching unit 51 is supplied into the mixing unit 61 through first fluid outlets 55. The mixed fluid drawn into the mixing unit 61 slides along inclined baffles 63 and is further agitated in sections which are formed by partitioning the space in the mixing unit 61. The sections in the mixing unit 61 are separated from each other by partitions 62. Thereafter, the mixed fluid which has been in the separated sections is discharged out of the mixing unit 61 through one or more second fluid outlets 65 which are formed in an inner sidewall 64 which is concentric with an outer sidewall 68 of the mixing unit 61. As well, guides 66 may be provided in the circular hole 67. The guides 66 function to swirl the fluid discharged from the second fluid outlets 65, thus further agitating the fluid. Thereby, the quenching apparatus of the present invention can further enhance the mixing performance.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The present invention provides a quenching apparatus in which swirls of fluid can be created throughout the entirety of the three-dimensional space of the inside of a quenching unit rather than being created only in a two-dimensional plane. Furthermore, the creation of fluid turbulence is maximized in the mixing unit. Therefore, the fluid mixing efficiency of the apparatus can be markedly enhanced.

Moreover, outlets are formed in the inner sidewall of the mixing unit, so that when the fluid passes through the outlets, it can be further agitated. In addition, guides are provided in a circular hole which communicates with the outlets. Thus, the fluid swirls when it drops downwards through the circular hole, thus maximizing contact between gas and liquid.

The invention claimed is:

1. A quenching apparatus for a reactor, comprising a quenching unit and a mixing unit,
    wherein the quenching unit comprises fluid distribution pipes branching radially off from a central portion of the quenching unit and ejecting quenching fluid, and one or more first fluid outlets formed through a bottom of the quenching unit, and
    the mixing unit comprises: inclined baffles respectively disposed under the first fluid outlets; one or more partitions partitioning a space between inner and outer sidewalls of the mixing unit into a plurality of separated spaces in which the inclined baffles are respectively disposed; and a second fluid outlet through which fluid agitated by the inclined baffles and the partitions is discharged out of the mixing unit.

2. The quenching apparatus according to claim 1, wherein the fluid distribution pipes are connected to a fluid supply pipe, the fluid supply pipe supplying the quenching fluid from an outside of the reactor into the quenching unit.

3. The quenching apparatus according to claim 1, wherein the fluid distribution pipes extending radially from the central portion of the quenching unit are configured such that first ends of the fluid distribution pipes are disposed at a radial center of the quenching unit and second ends thereof are disposed higher than the first ends thereof.

4. The quenching apparatus according to claim 1, wherein each of the inclined baffles is inclined downwards by a predetermined angle, so that fluid that has dropped vertically from the corresponding first fluid outlet comes into contact with the inclined baffle and flows downwards therealong.

5. The quenching apparatus according to claim 1, wherein the fluid distribution pipes comprise two or more fluid distribution pipes.

6. The quenching apparatus according to claim 1, wherein a plurality of baffles is provided on the bottom of the quenching unit.

7. The quenching apparatus according to claim 1, wherein a plurality of baffles is provided on a bottom of the mixing unit.

8. The quenching apparatus according to claim 1, wherein the one or more first fluid outlets are disposed at positions corresponding to the space between the inner and outer sidewalls of the mixing unit.

9. The quenching apparatus according to claim 1, wherein the one or more first fluid outlets are arranged concentrically with an outer sidewall of the quenching unit.

10. The quenching apparatus according to claim 1, wherein fluid discharge holes are formed in each of the fluid distribution pipes and arranged along a longitudinal direction of the fluid distribution pipe.

11. The quenching apparatus according to claim 1, wherein the quenching unit is reduced in cross-sectional area from the top to the bottom.

12. The quenching apparatus according to claim 1, wherein the second fluid outlet is formed through the inner sidewall of the mixing unit, and a guide is provided around the second fluid outlet to swirl the fluid.

* * * * *